United States Patent
Ramanathan et al.

(10) Patent No.: US 11,595,464 B2
(45) Date of Patent: Feb. 28, 2023

(54) MIGRATION OF NETWORK FILE COPY OPERATIONS BETWEEN HOST COMPUTING DEVICES

(71) Applicant: VMware, Inc., Palo Alto, CA (US)

(72) Inventors: Arunachalam Ramanathan, Union City, CA (US); Nathan L. Prziborowski, Eugene, OR (US); Anupama Chandwani, San Jose, CA (US); Yanlei Zhao, Sunnyvale, CA (US); Li Zheng, Palo Alto, CA (US); Alexander Krits, Austin, TX (US); Pavan Narasimhaprasad, Austin, TX (US); Gabriel Tarasuk-Levin, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/384,362

(22) Filed: Jul. 23, 2021

(65) Prior Publication Data

US 2023/0028675 A1    Jan. 26, 2023

(51) Int. Cl.
| | |
|---|---|
| *G06F 8/65* | (2018.01) |
| *H04L 67/06* | (2022.01) |
| *G06F 16/11* | (2019.01) |
| *H04L 67/00* | (2022.01) |
| *H04L 67/1097* | (2022.01) |
| *G06F 9/455* | (2018.01) |

(52) U.S. Cl.
CPC ............... *H04L 67/06* (2013.01); *G06F 8/65* (2013.01); *G06F 9/45558* (2013.01); *G06F 16/119* (2019.01); *H04L 67/1097* (2013.01); *H04L 67/34* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 5,991,753 | A * | 11/1999 | Wilde | G06F 16/10 |
| 6,397,385 | B1 * | 5/2002 | Kravitz | G06F 9/328 |
| | | | | 717/169 |
| 7,484,208 | B1 * | 1/2009 | Nelson | G06F 3/0647 |
| | | | | 718/1 |
| 9,733,860 | B2 * | 8/2017 | Reuther | G06F 3/0647 |
| 10,341,177 | B2 * | 7/2019 | Kato | H04L 67/34 |

(Continued)

*Primary Examiner* — Marina Lee
(74) *Attorney, Agent, or Firm* — Kim & Stewart LLP

(57) ABSTRACT

A method of migrating a network file copy (NFC) operation from a first host computing device to a second host computing device includes the steps of: transmitting a first request to the first host computing device to execute the NFC operation, wherein the NFC operation comprises transferring data from a shared datastore to another datastore; after transmitting the first request, selecting the second host computing device to complete the NFC operation in place of the first host computing device, and transmitting a second request to the first host computing device to stop executing the NFC operation; after transmitting the second request, detecting a message indicating that the first host computing device completed the copying of a first portion of the data; and in response to the detection of the message, transmitting a third request to the second host computing device to perform the remainder of the NFC operation.

20 Claims, 7 Drawing Sheets

(56) References Cited

U.S. PATENT DOCUMENTS

| | | | | |
|---|---|---|---|---|
| 2012/0259819 A1* | 10/2012 | Patwardhan | .......... | G06F 16/119 707/674 |
| 2015/0378783 A1* | 12/2015 | Tarasuk-Levin | ........ | G06F 12/08 718/1 |
| 2022/0035662 A1* | 2/2022 | Wiggers | .............. | G06F 9/45558 |
| 2022/0229774 A1* | 7/2022 | Waldspurger | ....... | G06F 12/0246 |

* cited by examiner

MIGRATION OF NETWORK FILE COPY OPERATIONS BETWEEN HOST COMPUTING DEVICES

BACKGROUND

Network file copy (NFC) operations are used for transferring data between storage devices across a network. For example, through a "remote" NFC operation, a "source" host computing device reads data from a first datastore and transmits the data to a "destination" host, and the destination host stores the data in a second datastore. Similarly, through a "local" NFC operation in which a single host has access to first and second datastores, the host reads data from the first data store and stores the data in the second datastore. The data copied through an NFC operation may be, e.g., a virtual disk of a virtual machine (VM) or software to be run by a VM. Such NFC operations may be used to support various applications, including cloning a VM, migrating a VM while the VM is not executing (i.e., performing a "cold" migration of the VM), and backing up both VM and non-VM files.

In a cloud computing environment, there is often a separation between a virtual infrastructure (VI) administrator and a cloud administrator. The VI administrator performs regular maintenance of hosts, including upgrading virtual infrastructure therein. The cloud administrator performs operations such as NFC operations on hosts to optimize resource utilization across a datacenter. However, the performances of maintenance and NFC operations often conflict with each other. For example, NFC operations often take a long time to execute, e.g., several hours to transfer a virtual disk that is multiple terabytes in size. While a host is executing such a long NFC operation, the host is blocked from entering maintenance mode. If, for example, a VI administrator needs to perform a critical upgrade such as a security-related upgrade, the VI administrator currently has two options. Firstly, the VI administrator may wait for the NFC operation to complete, which may disrupt a host's maintenance schedule. Secondly, the VI administrator may disrupt the cloud administrator by "killing" the NFC operation, which results in a loss of work and requires the cloud administrator to restart the NFC operation. A solution to these conflicts that is non-disruptive to both the VI and cloud administrators is needed.

SUMMARY

Accordingly, one or more embodiments provide a method of migrating a network file copy (NFC) operation from a first host computing device to a second host computing device, wherein the first and second host computing devices access a shared datastore. The method includes the steps of: transmitting a first request to the first host computing device to execute the NFC operation, wherein the NFC operation comprises transferring data from the shared datastore to another datastore; after transmitting the first request, selecting the second host computing device to complete the NFC operation in place of the first host computing device, and transmitting a second request to the first host computing device to stop executing the NFC operation; after transmitting the second request, detecting a message indicating that the first host computing device completed the copying of a first portion of the data; and in response to the detection of the message, transmitting a third request to the second host computing device to perform the remainder of the NFC operation excluding storing the first portion of the data in the other datastore.

Further embodiments include a non-transitory computer-readable storage medium comprising instructions that cause a computer system to carry out the above method, as well as a computer system configured to carry out the above method.

DETAILED DESCRIPTION

Techniques for migrating an NFC operation without disrupting its progress are described. Migrating an NFC operation from one host to another allows the NFC operation to complete without disruption. Furthermore, the host from which an NFC operation is migrated becomes free, e.g., to enter maintenance mode. Such a migration is described in three different contexts.

The first two contexts involve remote NFC operations requiring source and destination hosts to transfer data between datastores. In the first context, the destination host is switched during the NFC operation, and a source host completes the NFC operation with a second destination host. In the second context, the source host is switched during the NFC operation, and a second source host completes the NFC operation with a destination host. The third context involves a local NFC operation in which a single host transfers data from one datastore to another. In the third context, the host is switched with a second host that also has access to both datastores, and the second host completes the NFC operation. These and further aspects of the invention are discussed below with respect to the drawings.

Figure 1:
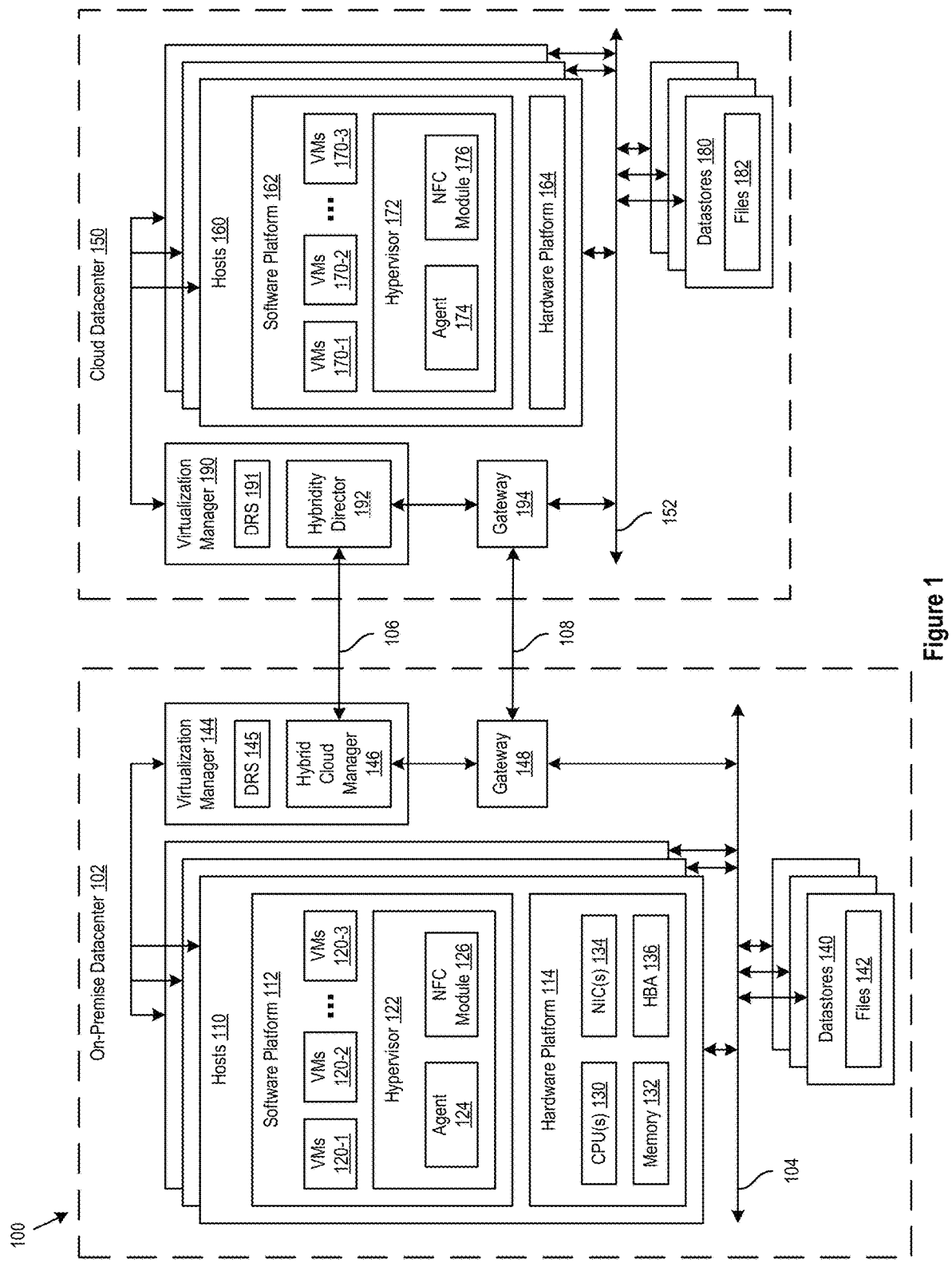
FIG. 1 is a block diagram of a hybrid cloud computing system in which embodiments of the present invention may be implemented.

FIG. 1 is a block diagram of a hybrid cloud computing system 100 in which embodiments of the present invention may be implemented. Hybrid cloud computing system 100 includes an on-premise datacenter 102 and a cloud datacenter 150 and provides a common platform for managing and executing virtual workloads seamlessly between the datacenters. On-premise datacenter 102 may be controlled and administrated by a particular enterprise or business organization. Cloud datacenter 150 may be operated by a cloud computing service provider to expose a "public" cloud service to various account holders. In other embodiments, the particular enterprise or business controlling on-premise datacenter 102 may control cloud datacenter 150 as a "private" cloud service. Furthermore, although FIG. 1 depicts an on-premise data center 102, the teachings herein may instead be applied to multiple cloud datacenters in which NFC operations are performed to transfer data between the datacenters.

On-premise datacenter 102 includes hosts 110 that may be constructed on server grade hardware platforms 114 such as x86 architecture platforms. Each hardware platform 114 includes conventional components of a computing device, such as one or more central processing units (CPUs) 130, system memory 132 such as random-access memory (RAM), optional local storage (not shown) such as one or more hard disk drives (HDDs) or solid-state drives (SSDs), one or more network interface cards (NICs) 134, and a host bus adapter (HBA) 136.

CPU(s) 130 are configured to execute instructions such as executable instructions that perform one or more operations described herein, which may be stored in system memory 132. NIC(s) 134 enable a host 110 to communicate with other devices over a physical network 104. HBA 136 couples a host 110 to datastores 140 over physical network 104. Datastores 140 are storage arrays of a network data storage system such as a storage area network (SAN) or network-attached storage (NAS). Datastores 140 store files 142 such as virtual disks of VMs 120 and software to be run by VMs 120.

Each host 110 includes a software platform 112 on which a hypervisor 122, which is a virtualization software layer, abstracts hardware resources of a hardware platform 114 for concurrently running VMs 120. One example of a hypervisor 122 that may be used is a VMware ESXi™ hypervisor by VMware, Inc. Each hypervisor 122 includes an agent 124 and an NFC module 126. Agent 124 connects a host 110 to a virtualization manager 144, and NFC module 126 is configured to execute remote and local NFC operations involving datastores 140. Although the disclosure is described with reference to VMs, the teachings herein also apply to nonvirtualized applications and to other types of virtual computing instances such as containers, Docker containers, data compute nodes, isolated user space instances, and the like for which data may be transferred pursuant to network copy mechanisms.

Virtualization manager 144 communicates with hosts 110 by transmitting and receiving data to and from agents 124 via a management network (not shown). Virtualization manager 144 performs administrative tasks such as managing hosts 110, provisioning and managing VMs 120, migrating VMs 120 from one host 110 to another, and load balancing between hosts 110. Virtualization manager 144 may be a computer program that resides and executes in a central server or, in other embodiments, a VM 120 executing in one of hosts 110. One example of a virtualization manager is the VMware vCenter Server® by VMware, Inc.

Virtualization manager 144 includes a distributed resource scheduler (DRS) 145 for performing administrative tasks. For example, DRS 145 may comprise a flag for each host 110 indicating whether a host 110 is scheduled to perform an upgrade soon, e.g., within the next twenty-four hours. Virtualization manager 144 may determine not to migrate an NFC operation to a host 110 that is scheduled to perform an upgrade soon. DRS 145 may also comprise a flag for each host 110 indicating whether a host 110 recently performed an upgrade, e.g., within the previous twenty-four hours. Virtualization manager 144 may determine to migrate an NFC operation to a host 110 that recently performed an upgrade, and which presumably will not need to perform an upgrade during a migrated NFC operation.

Virtualization manager 144 also includes a hybrid cloud manager 146 configured to manage and integrate virtual computing resources provided by cloud datacenter 150 with those of on-premise datacenter 102. Such integration forms a unified "hybrid" computing platform. Hybrid cloud manager 146 performs "cross-cloud" administrative tasks such as deploying VMs 170 in cloud datacenter 150, transferring VMs 120 from on-premise datacenter 102 to cloud datacenter 150, and performing other "cross-cloud" administrative tasks. Hybrid cloud manager 146 may be a module or plug-in to virtualization manager 144 or a separate computer program executing in a central server or in a VM 120 in one of hosts 110.

Hybrid cloud manager 146 controls network traffic into physical network 104 via a gateway 148. Gateway 148 may be a computer program executing in a central server or in a VM 120 in one of hosts 110. Gateway 148 provides VMs 120 and other devices in on-premise datacenter 102 with connectivity to an external network 108, e.g., the Internet. Gateway 148 manages public internet protocol (IP) addresses for VMs 120 and routes traffic incoming to and outgoing from on-premise datacenter 102. Gateway 148 may also provide networking services such as firewalls, network address translation (NAT), dynamic host configuration protocol (DHCP), load balancing, and virtual private network (VPN) connectivity over external network 108.

Cloud datacenter 150 includes hosts 160 that may be constructed on server grade hardware platforms 164 such as x86 architecture platforms. Like hardware platforms 114, each hardware platform 164 includes conventional components of a computing device, such as one or more CPUs, system memory, optional local storage, one or more NICs, and an HBA (not shown). The CPU(s) of a host 160 are configured to execute instructions such as executable instructions that perform one or more operations described herein, which may be stored in system memory. The NIC(s) of a host 160 enable the host 160 to communicate with other devices over a physical network 152. The HBA of a host 160 couples the host 160 to datastores 180 over physical network 152. Like datastores 140, datastores 180 are storage arrays of a network data storage system, and datastores 180 store files 182 such as virtual disks of VMs 170 and software to be run by VMs 170.

Like hosts 110, each host 160 includes a software platform 162 on which a hypervisor 172 abstracts hardware resources of a hardware platform 164 for concurrently running VMs 170. Each hypervisor 172 includes an agent 174 for connecting to a virtualization manager 190 and an NFC module 176 for executing remote and local NFC operations involving datastores 180.

Virtualization manager 190 communicates with hosts 160 by transmitting and receiving data to and from agents 174 via a management network (not shown). Virtualization manager 190 includes a DRS 191 for performing administrative tasks. For example, DRS 191 may comprise a flag for each host 160 indicating whether a host 160 is scheduled to perform an upgrade soon, e.g., within the next twenty-four hours. Virtualization manager 190 may determine not to migrate an NFC operation to a host 160 that is scheduled to perform an upgrade soon. DRS 191 may also comprise a flag for each host 160 indicating whether a host 160 recently performed an upgrade, e.g., within the previous twenty-four hours. Virtualization manager 190 may determine to migrate an NFC operation to a host 160 that recently performed an upgrade, and which presumably will not need to perform an upgrade during a migrated NFC operation.

Virtualization manager 190 also includes a hybridity director 192 that communicates with hybrid cloud manager 146 via a VPN tunnel over external network 108 or via a direct connect 106. Hybridity director 192 may be a module or plug-in to virtualization manager 190 or a separate computer program executing in a central server or in a VM 170 in one of hosts 160. Hybridity director 192 controls network traffic into physical network 152 via a gateway 194. Gateway 194 may be a computer program executing in a central server or in a VM 170 in one of hosts 160. Gateway 194 provides VMs 170 and other devices in cloud datacenter 150 with connectivity to external network 108. Gateway 194 may also provide networking services such as VPN connectivity over external network 108.

Figure 2A:
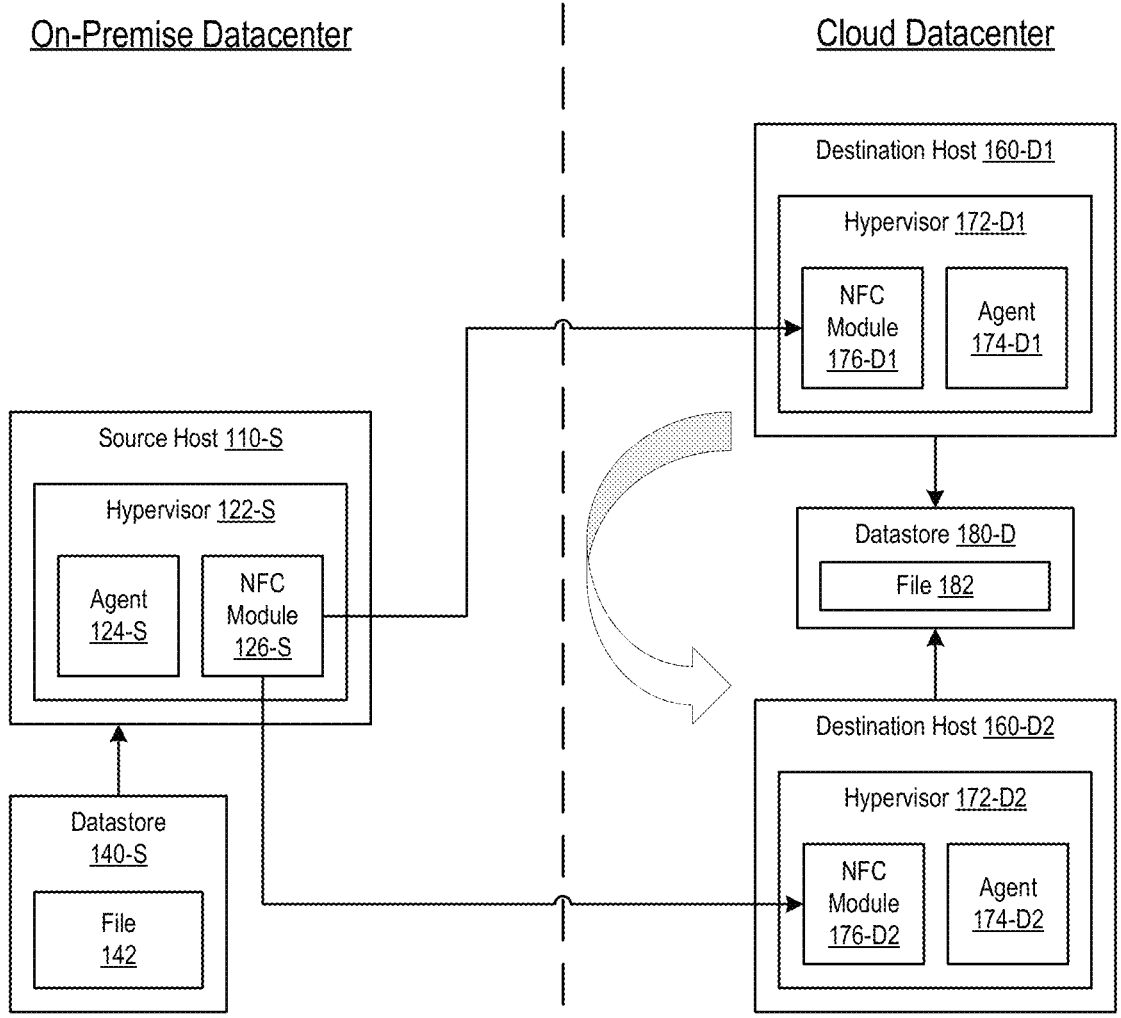
FIG. 2A is a block diagram illustrating the migration of a remote NFC operation between destination hosts, according to an embodiment.

FIG. 2A is a block diagram illustrating the migration of a remote NFC operation between destination hosts, according to an embodiment. In the example of FIG. 2A, a source host 110-S in on-premise datacenter 102 begins performing an NFC operation with a first destination host 160-D1 in cloud datacenter 150. As such, the devices in on-premise datacenter 102 will be referred to as being sources, e.g., "source" virtualization manager 144, and devices in cloud datacenter 150 will be referred to as being destinations, e.g., "destination" virtualization manager 190. However, the migration of remote NFC operations may also be implemented for operations in which destination hosts are in on-premise datacenter 102.

Pursuant to the NFC operation, source host 110-S begins reading a file 142 from a source datastore 140-S and transmitting the file 142 to first destination host 160-D1 to be stored in a destination datastore 180-D as a file 182. Later, e.g., when it is time for first destination host 160-D1 to enter maintenance mode but before the NFC operation has completed, the NFC operation is migrated to a second destination host 160-D2. Source host 110-S then performs the remainder of the NFC operation by transmitting the remainder of the file 142 to second destination host 160-D2 to be stored in destination datastore 180-D.

Hosts 110-S, 160-D1, and 160-D2 contain hypervisors 122-S, 172-D1, and 172-D2, respectively. Hypervisor 122-S includes an agent 124-S for connecting to source virtualization manager 144 of FIG. 1. Hypervisors 172-D1 and 172-D2 include agents 174-D1 and 174-D2, respectively, for connecting to destination virtualization manager 190 of FIG. 1. Furthermore, NFC modules 126-S, 176-D1, and 176-D2 execute the NFC operation by communicating across external network 108 of FIG. 1 to transfer the file 142.

Figure 2B:
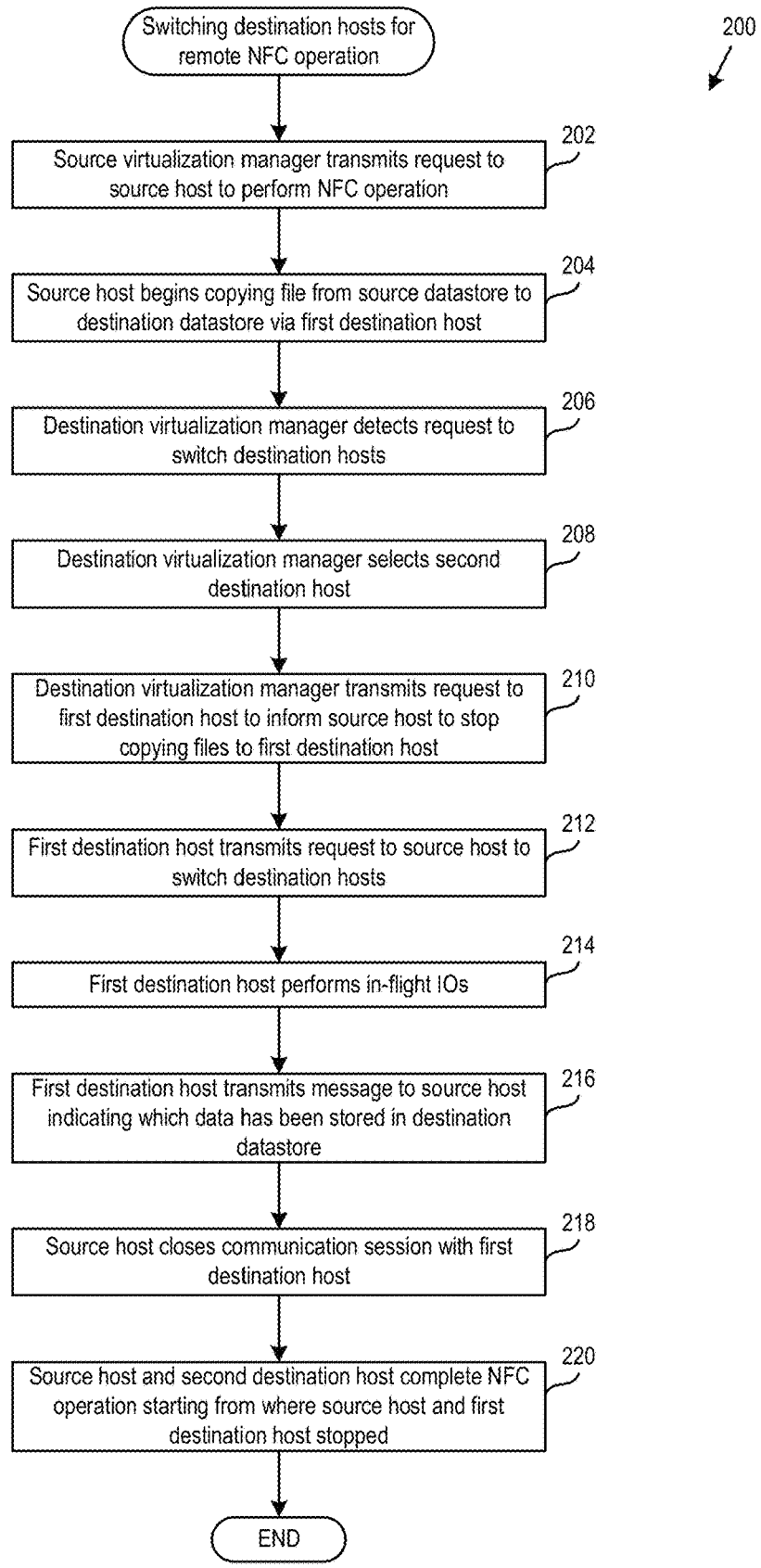
FIG. 2B is a flow diagram of steps to carry out a method of migrating a remote NFC operation between destination hosts, according to an embodiment.

FIG. 2B is a flow diagram of steps to carry out a method 200 of migrating a remote NFC operation between destination hosts, according to an embodiment. Method 200 will be explained with reference to hosts 110-S, 160-D1, and 160-D2 of FIG. 2A.

At step 202, source virtualization manager 144 transmits a request to source host 110-S via agent 124-S to perform an NFC operation. The request includes information such as an IP address of first destination host 160-D1, a first authentication certificate for establishing a secure connection with first destination host 160-D1, and an address of a file 142 to read from source datastore 140-S. For example, the first authentication certificate may contain a timeout requiring source host 110-S to create an NFC connection with first destination host 160-D1 using this timeout-based certificate within a predetermined amount of time.

At step 204, source host 110-S transmits the first authentication certificate to first destination host 160-D1 and begins gradually copying the file 142 from source datastore 140-S to destination datastore 180-D via first destination host 160-D1. Specifically, NFC module 126-S transmits data of the file 142 to NFC module 176-D1, which stores the transmitted data in destination datastore 180-D.

At step 206, destination virtualization manager 190 detects a request to switch destination hosts, e.g., from a VI administrator. For example, the VI administrator may make the request to perform scheduled maintenance of first destination host 160-D1. At step 208, destination virtualization manager 190 selects second destination host 160-D2 to perform the remainder of the NFC operation. For example, destination virtualization manager 190 ensures that second destination host 160-D2 is configured to perform NFC operations and that second destination host 160-D2 either recently performed maintenance or is otherwise not scheduled to perform maintenance soon. To determine that second destination host 160-D2 is a convenient host to migrate the NFC operation to, DRS 191 may check a flag indicating that second destination host 160-D2 is not scheduled to perform an upgrade soon or a flag indicating that second destination host 160-D2 recently performed an upgrade.

At step 210, destination virtualization manager 190 transmits a request to first destination host 160-D1 via agent 174-D1 to inform source host 110-S to stop copying files via first destination host 160-D1. For example, the request may include an instruction for first destination host 160-D1 to enter maintenance mode to upgrade software running therein. The request includes information such as the IP address of second destination host 160-D2 and a second authentication certificate for establishing a secure connection with second destination host 160-D2. For example, the second authentication certificate may contain a timeout requiring source host 110-S to create an NFC connection with second destination host 160-D2 using this timeout-based certificate within a predetermined amount of time. At step 212, first destination host 160-D1 transmits a request to source host 110-S to switch destination hosts, the request including the information such as the IP address of second destination host 160-D2 and the second authentication certificate.

At step 214, first destination host 160-D1 completes any in-flight input/output operations (IOs) already requested by source host 110-S. Such in-flight IOs include storing, in destination datastore 180-D, portions of the file 142 that have already been transmitted by source host 110-S. Alternatively, first destination host 160-D1 may kill in-flight IOs to enter maintenance mode more quickly. However, for such killed in-flight IOs, data of the file 142 must then be retransmitted by source host 110-S to second destination host 160-D2.

At step 216, first destination host 160-D1 transmits a message to source host 110-S indicating which data has been stored in destination datastore 180-D. For example, first destination host 160-D1 may transmit an offset of the file 142 up to which first destination host 160-D1 stored the file 142 in destination datastore 180-D. At step 218, source host 110-S closes its communication session with first destination host 160-D1.

At step 220, source host 110-S transmits the second authentication certificate to second destination host 160-D2, and hosts 110-S and 160-D2 complete the NFC operation. Specifically, NFC module 126-S gradually transmits the remaining data of the file 142 to NFC module 176-D2, e.g., starting from immediately after an offset received from first destination host 160-D1 at step 216. NFC module 176-D2 may then store the transmitted data in destination datastore 180-D. As such, the switch of destination hosts is a seamless migration of the NFC operation without any loss of the work performed by first destination host 160-D1. After step 220, method 200 ends.

Method 200 is explained in the context of an NFC operation involving copying a single file 142 from source datastore 140-S to destination datastore 180-D. However, an NFC operation may require the copying of multiple files 142, e.g., multiple virtual disks of VMs 120. In such a case, before the switch, first destination host 160-D1 transmits information indicating which (if any) files 142 have been stored in destination datastore 180-D and the progress, e.g., an offset, of a file 142 for which a portion has been stored in destination datastore 180-D. Upon detecting the information, source host 110-S may resume the NFC operation with second destination host 160-D2 on the remaining data of the NFC operation.

Figure 3A:
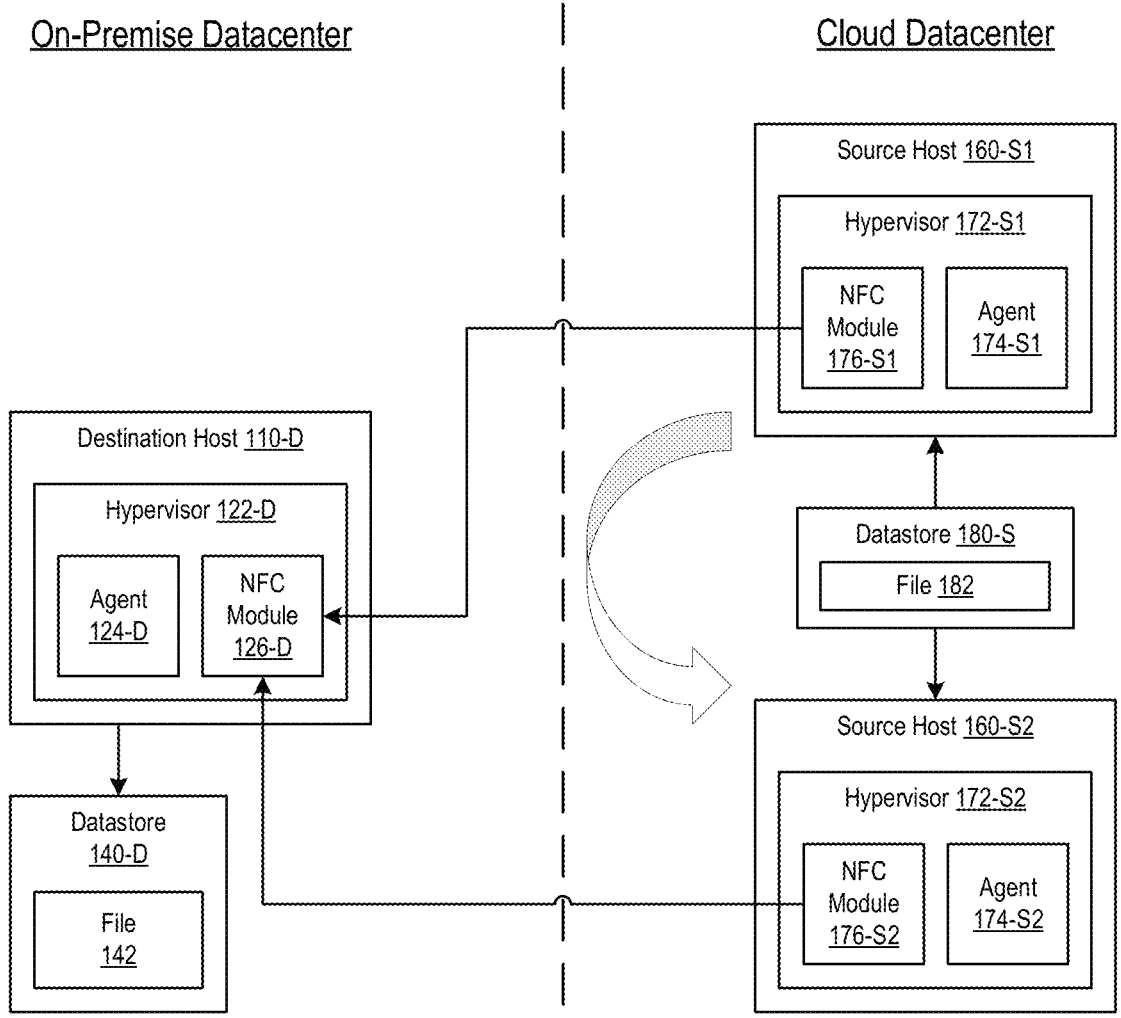
FIG. 3A is a block diagram illustrating the migration of a remote NFC operation between source hosts, according to an embodiment.

FIG. 3A is a block diagram illustrating the migration of a remote NFC operation between source hosts, according to an embodiment. In the example of FIG. 3A, a first source host 160-S1 in cloud datacenter 150 begins performing an NFC operation with a destination host 110-D in on-premise datacenter 102. As such, the devices in on-premise datacenter 102 will be referred to as being destinations, e.g., "destination" virtualization manager 144, and devices in cloud datacenter 150 will be referred to as being sources, e.g., "source" virtualization manager 190. However, the migration of remote NFC operations may also be implemented for operations in which source hosts are in on-premise datacenter 102.

Pursuant to the NFC operation, first source host 160-S1 begins reading a file 182 from a source datastore 180-S and transmitting the file 182 to destination host 110-D to be stored in a destination datastore 140-D as a file 142. Later, e.g., when it is time for first source host 160-S1 to enter maintenance mode but before the NFC operation has completed, the NFC operation is migrated to a second source host 160-S2. Second source host 160-S2 then performs the remainder of the NFC operation by transmitting the remainder of the file 182 to destination host 110-D to be stored in destination datastore 140-D.

Hosts 160-S1, 160-S2, and 110-D contain hypervisors 172-S1, 172-S2, and 122-D, respectively. Hypervisors 172-S1 and 172-S2 include agents 174-S1 and 174-S2, respectively, for connecting to source virtualization manager 190 of FIG. 1. Hypervisor 122-D includes an agent 124-D for connecting to destination virtualization manager 144 of FIG. 1. Furthermore, NFC modules 176-S1, 176-S2, and 126-D execute the NFC operation by communicating across external network 108 of FIG. 1 to transfer the file 182.

Figure 3B:
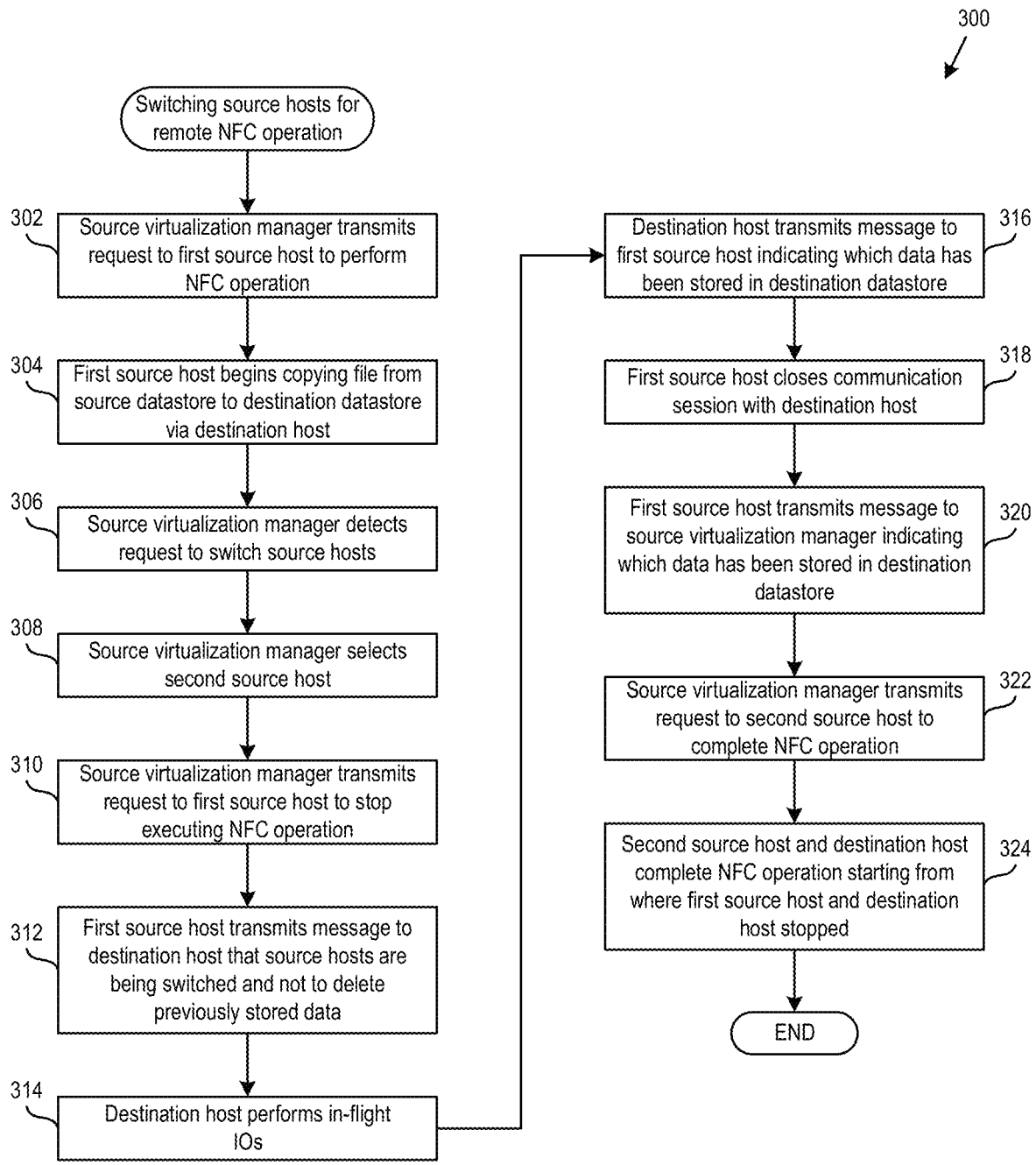
FIG. 3B is a flow diagram of steps to carry out a method of migrating a remote NFC operation between source hosts, according to an embodiment.

FIG. 3B is a flow diagram of steps to carry out a method 300 of migrating a remote NFC operation between source hosts, according to an embodiment. Method 300 will be explained with reference to hosts 110-D, 160-S1, and 160-S2 of FIG. 3A.

At step 302, source virtualization manager 190 transmits a request to first source host 160-S1 via agent 174-S1 to perform an NFC operation. The request includes information such as an IP address of destination host 110-D, a first authentication certificate for establishing a secure connection with destination host 110-D, and an address of a file 182 to read from source datastore 180-S. For example, the first authentication certificate may contain a timeout requiring first source host 160-S1 to create an NFC connection with destination host 110-D using this timeout-based certificate within a predetermined amount of time.

At step 304, first source host 160-S1 transmits the first authentication certificate to destination host 110-D and begins gradually copying the file 182 from source datastore 180-S to destination datastore 140-D via destination host 110-D. Specifically, NFC module 176-S1 transmits data of the file 182 to NFC module 126-D, which stores the transmitted data in destination datastore 140-D.

At step 306, source virtualization manager 190 detects a request to switch source hosts, e.g., from a VI administrator. For example, the VI administrator may make the request to perform scheduled maintenance of first source host 160-S1. At step 308, source virtualization manager 190 selects second source host 160-S2 to perform the remainder of the NFC operation. For example, source virtualization manager 190 ensures that second source host 160-S2 is configured to perform NFC operations and that second source host 160-S2 either recently performed maintenance or is otherwise not scheduled to perform maintenance soon. To determine that second source host 160-S2 is a convenient host to migrate the NFC operation to, DRS 191 may, e.g., check a flag indicating that second source host 160-S2 is not scheduled to perform an upgrade soon or a flag indicating that second source host 160-S2 recently performed an upgrade.

At step 310, source virtualization manager 190 transmits a request to first source host 160-S1 via agent 174-S1 to stop executing the NFC operation. For example, the request may include an instruction for first source host 160-S1 to enter maintenance mode to upgrade software running therein. At step 312, first source host 160-S1 transmits a message to destination host 110-D indicating that source hosts are being switched and not to delete data that has already been stored in destination datastore 140-D pursuant to the NFC operation.

At step 314, destination host 110-D completes any in-flight IOs already requested by first source host 160-S1. Such in-flight IOs include storing, in destination datastore 140-D, portions of the file 182 that have already been transmitted by first source host 160-S1. Alternatively, destination host 110-D may kill in-flight IOs to enter maintenance mode more quickly. However, for such killed in-flight IOs, data of the file 182 must then be retransmitted by second source host 160-S2 to destination host 110-D.

At step 316, destination host 110-D transmits a message to first source host 160-S1 indicating which data has been stored in destination datastore 140-D. For example, destination host 110-D may transmit an offset of the file 182 up to which destination host 110-D stored the file 182 in destination datastore 140-D. At step 318, first source host 160-S1 closes its communication session with destination host 110-D.

At step 320, first source host 160-S1 transmits a message to source virtualization manager 190 via agent 174-S1 indicating which data has been stored in destination datastore 140-D, e.g., an offset received from destination host 110-D at step 316. At step 322, source virtualization manager 190 transmits a request to second source host 160-S2 via agent 174-S2 to perform the remainder of the NFC operation. The request indicates which data has been stored in destination datastore 140-D, e.g., by including an offset received from first source host 160-S1 at step 320. The request also includes a second authentication certificate for establishing a secure connection with destination host 110-D. For example, the second authentication certificate may contain a timeout requiring second source host 160-S2 to create an NFC connection with destination host 110-D using this timeout-based certificate within a predetermined amount of time.

At step 324, second source host 160-S2 transmits the second authentication certificate to destination host 110-D, and hosts 160-S2 and 110-D complete the NFC operation. Specifically, NFC module 176-S2 gradually transmits the remaining data of the file 182 to NFC module 126-D, e.g., starting from immediately after an offset received from source virtualization manager 190 at step 322 NFC module 126-D may then store the transmitted data in destination datastore 140-D. As such, the switch of source hosts is a seamless migration of the NFC operation without any loss of the work performed by first source host 160-S1. After step 324, method 300 ends.

Method 300 is explained in the context of an NFC operation involving copying a single file 182 from source datastore 180-S to destination datastore 140-D. However, in the case of an NFC operation involving multiple files 182, before the switch, destination host 110-D transmits information indicating which (if any) files 182 have been stored in destination datastore 140-D and the progress, e.g., an offset, of a file 182 for which a portion has been stored in destination datastore 140-D. Upon detecting the information, second source host 160-S2 may resume the NFC operation with destination host 110-D on the remaining data of the NFC operation.

Figure 4A:
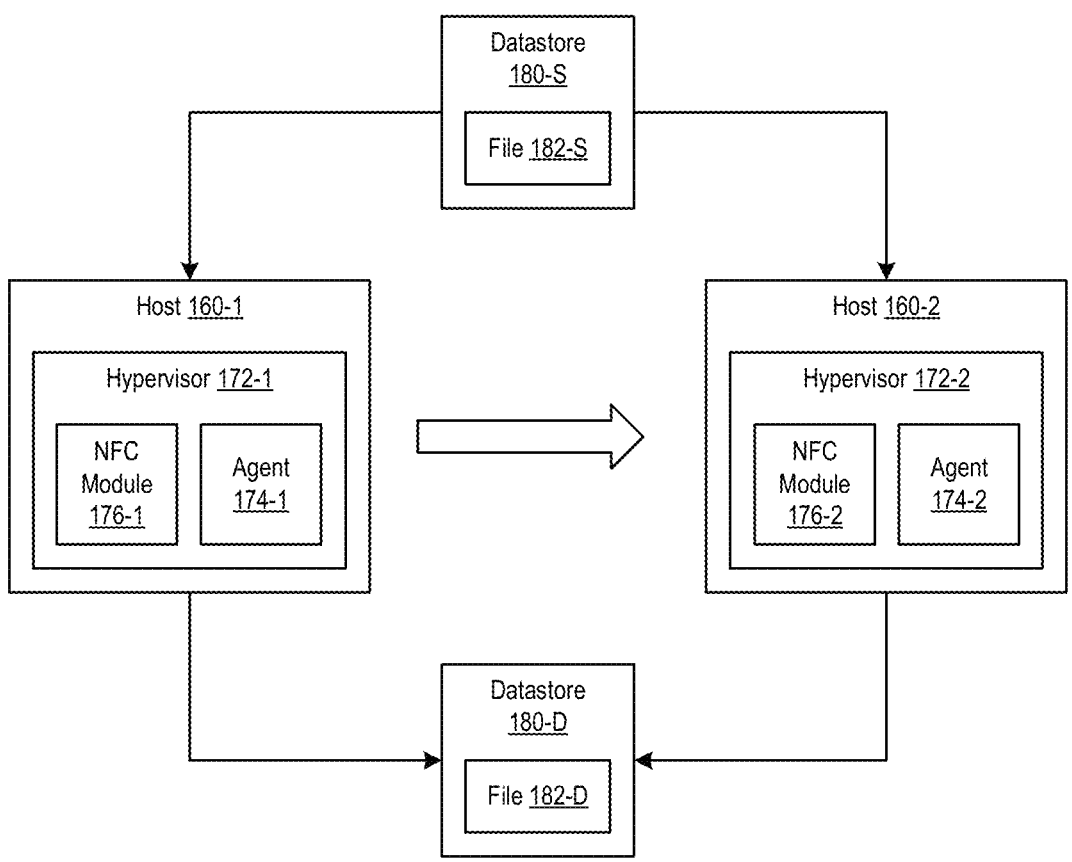
FIG. 4A is a block diagram illustrating the migration of a local NFC operation between hosts, according to an embodiment.

FIG. 4A is a block diagram illustrating the migration of a local NFC operation between hosts 160, according to an embodiment. However, the migration of local NFC operations may also be implemented for operations in which hosts are in on-premise datacenter 102. In the example of FIG. 4A, a first host 160-1 in cloud datacenter 150 begins performing an NFC operation. Pursuant to the NFC operation, first host 160-1 begins reading a source file 182-S from a source datastore 180-S and storing the source file 182-S in a destination datastore 180-D as a destination file 182-D. Later, e.g., when it is time for first host 160-1 to enter maintenance mode but before the NFC operation has completed, the NFC operation is migrated to a second host 160-2. Second host 160-2 then performs the remainder of the NFC operation by storing the remainder of the source file 182-S in destination datastore 180-D.

Hosts 160-1 and 160-2 contain hypervisors 172-1 and 172-2, respectively. Hypervisors 172-1 and 172-2 include agents 174-1 and 174-2, respectively, for connecting to virtualization manager 190 of FIG. 1. Furthermore, NFC modules 176-1 and 176-2 execute the NFC operation to transfer the source file 182-S.

Figure 4B:
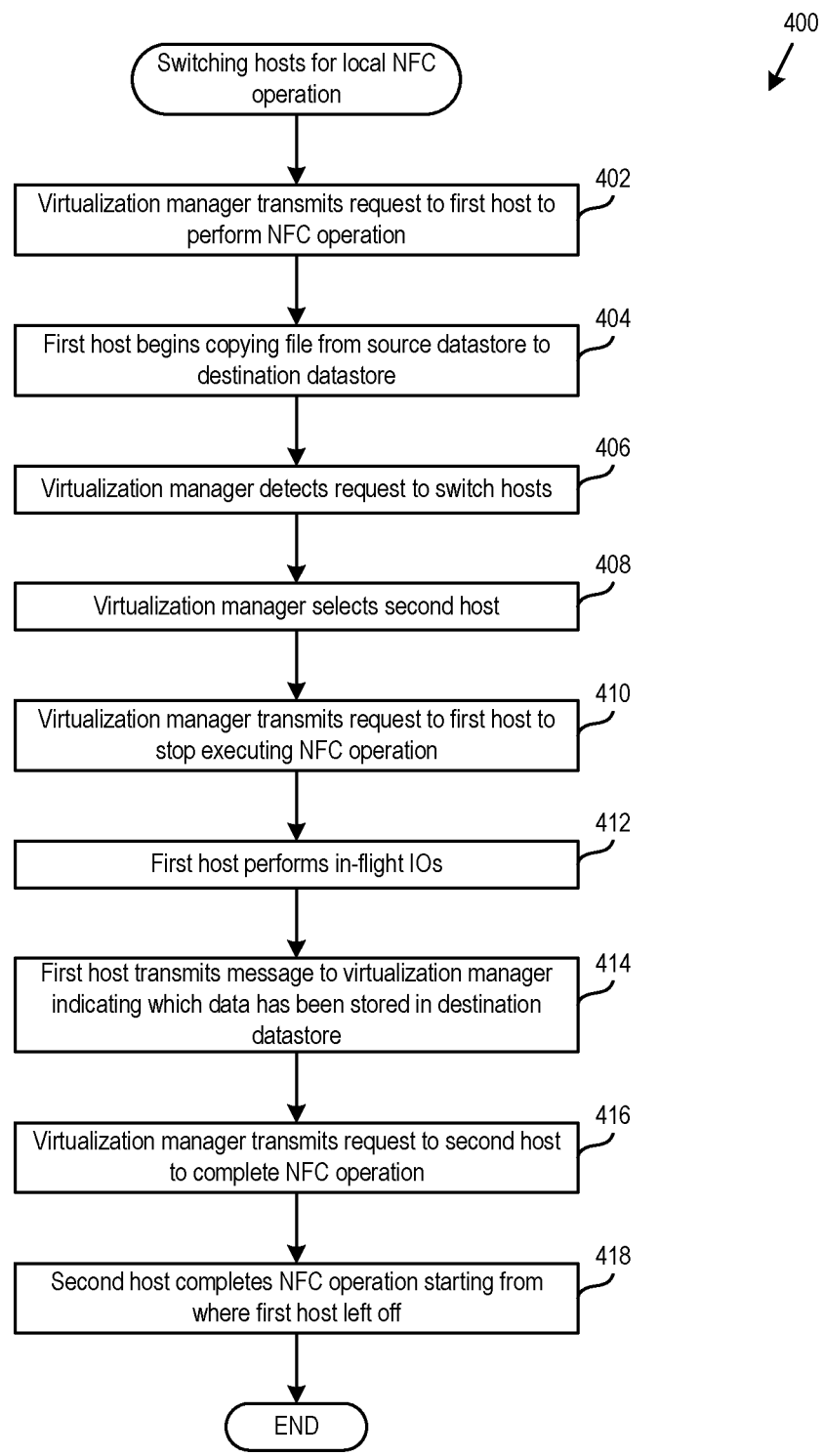
FIG. 4B is a flow diagram of steps to carry out a method of migrating a local NFC operation between hosts, according to an embodiment.

FIG. 4B is a flow diagram of steps to carry out a method 400 of migrating a local NFC operation between hosts, according to an embodiment. Method 400 will be explained with reference to hosts 160-1 and 160-2 of FIG. 4A.

At step 402, virtualization manager 190 transmits a request to first host 160-1 via agent 174-1 to perform an NFC operation. The request includes information such as an address of a source file 182-S to read from source datastore 180-S. At step 404, first host 160-1 begins gradually reading the source file 182-S from source datastore 180-S and storing the source file 182-S in datastore 180-D as destination file 182-D.

At step 406, virtualization manager 190 detects a request to switch source hosts, e.g., from a VI administrator. For example, the VI administrator may make the request to perform scheduled maintenance of first host 160-1. At step 408, virtualization manager 190 selects second host 160-2 to perform the remainder of the NFC operation. For example, virtualization manager 190 ensures that second host 160-2 is configured to perform NFC operations and that second host 160-2 either recently performed maintenance or is otherwise not scheduled to perform maintenance soon. To determine that second host 160-2 is a convenient host to migrate the NFC operation to, DRS 191 may check a flag indicating that second host 160-2 is not scheduled to perform an upgrade soon or a flag indicating that second host 160-2 recently performed an upgrade.

At step 410, virtualization manager 190 transmits a request to first host 160-1 via agent 174-1 to stop executing the NFC operation. For example, the request may include an instruction for first host 160-1 to enter maintenance mode to upgrade software running therein. At step 412, first host 160-1 completes any in-flight IOs. Such in-flight IOs include storing, in destination datastore 180-D, portions of the source file 182-S. Alternatively, first host 160-1 may kill in-flight IOs to enter maintenance mode more quickly.

At step 414, first host 160-1 transmits a message to virtualization manager 190 via agent 174-1 indicating which data has been stored in destination datastore 180-D. For example, first host 160-1 may transmit an offset of the source file 182-S up to which the source file 182-S has been stored in destination datastore 180-D. At step 416, virtualization manager 190 transmits a request to second host 160-2 via agent 174-2 to perform the remainder of the NFC operation. The request indicates which data has been stored in destination datastore 180-D, e.g., by including an offset received from first host 160-1 at step 414.

At step 418, second host 160-2 completes the NFC operation. Specifically, the remaining data of the source file 182-S, e.g., starting from immediately after an offset received from virtualization manager 190 at step 416. As such, the switch of hosts 160 is a seamless migration of the NFC operation without any loss of the work performed by first host 160-1. After step 418, method 400 ends.

Method 400 is explained in the context of an NFC operation involving copying a single source file 182-S from source datastore 180-S to destination datastore 180-D. However, in the case of an NFC operation involving multiple source files 182-S, before the switch, first host 160-1 transmits information indicating which (if any) files 182-S have been stored in destination datastore 180-D and the progress, e.g., an offset, of a source file 182-S for which a portion has been stored in destination datastore 180-D. Upon detecting the information, second host 160-2 may resume the NFC operation on the remaining data of the NFC operation.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data that can thereafter be input into a computer system. Computer readable media may be based on any existing or subsequently developed technology that embodies computer programs in a manner that enables a computer to read the programs. Examples of computer readable media are HDDs, SSDs, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest operating system (OS) that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of migrating a network file copy (NFC) operation from a first host computing device to a second host computing device, wherein the first and second host computing devices access a shared datastore, the method comprising:
    transmitting a first request to the first host computing device to execute the NFC operation, wherein the NFC operation comprises transferring data from the shared datastore to another datastore;
    after transmitting the first request, selecting the second host computing device to complete the NFC operation in place of the first host computing device, and transmitting a second request to the first host computing device to stop executing the NFC operation;
    after transmitting the second request, detecting a message indicating that the first host computing device completed copying of a first portion of the data; and
    in response to the detection of the message, transmitting a third request to the second host computing device to perform the remainder of the NFC operation excluding storing the first portion of the data in the other datastore.

2. The method of claim 1, further comprising instructing the first host computing device to upgrade software running on the first host computing device.

3. The method of claim 2, wherein selecting the second host computing device comprises determining that software running on the second host computing device is not scheduled for upgrade.

4. The method of claim 1, wherein the other datastore is inaccessible by both the first and second host computing devices, and wherein executing the NFC operation comprises the first and second host computing devices reading the data from the shared datastore and transmitting the data to a third host computing device that stores the transmitted data in the other datastore.

5. The method of claim 1, wherein the other datastore is accessible by both the first and second host computing devices, and wherein executing the NFC operation comprises the first and second host computing devices copying the data from the shared datastore to the other datastore.

6. The method of claim 1, wherein the NFC operation is performed by virtualization software layers, the virtualization software layers executing on the first and second host computing devices and abstracting hardware resources of the first and second host computing devices for virtual machines (VMs).

7. The method of claim 6, wherein the NFC operation comprises transmitting a virtual disk of a VM from the shared datastore to the other datastore.

8. A method of migrating a network file copy (NFC) operation from a first host computing device to a second host computing device, wherein the first and second host computing devices access a shared datastore, the method comprising:
    selecting the second host computing device to complete the NFC operation in place of the first host computing device, wherein the NFC operation comprises transferring data to the shared datastore from another datastore, and the first host computing device stores a first portion of the data in the shared datastore; and
    transmitting a first request to a third host computing device to stop executing the NFC operation with the first host computing device, wherein in response to receiving the first request, the third host computing device performs the remainder of the NFC operation with the second host computing device excluding storing the first portion of the data in the shared datastore.

9. The method of claim 8, further comprising instructing the first host computing device to upgrade software running on the first host computing device.

10. The method of claim 9, wherein selecting the second host computing device comprises determining that software running on the second host computing device is not scheduled for upgrade.

11. The method of claim 8, wherein the other datastore is inaccessible by both the first and second host computing devices, and wherein executing the NFC operation comprises the third host computing device reading the data from the other datastore and transmitting the data to the first and second host computing devices to store the transmitted data in the shared datastore.

12. The method of claim 8, wherein the NFC operation is performed by virtualization software layers, the virtualization software layers executing on the first, second, and third host computing devices and abstracting hardware resources of the first, second, and third host computing devices for virtual machines (VMs).

13. The method of claim 12, wherein the NFC operation comprises transmitting a virtual disk of a VM from the other datastore to the shared datastore.

14. A computer system comprising:
a plurality of host computing devices including first and second host computing devices; and
a plurality of datastores including a shared datastore accessible by the first and second host computing devices and another datastore, wherein one of the plurality of host computing devices includes a central processing unit (CPU) that is configured to:
transmit a first request to the first host computing device to execute an NFC operation, wherein the NFC operation comprises transferring data from the shared datastore to the other datastore,
after transmitting the first request, select the second host computing device to complete the NFC operation in place of the first host computing device, and transmit a second request to the first host computing device to stop executing the NFC operation,
after transmitting the second request, detect a message indicating that the first host computing device completed copying of a first portion of the data, and
in response to the detection of the message, transmit a third request to the second host computing device to perform the remainder of the NFC operation excluding storing the first portion of the data in the other datastore.

15. The computer system of claim 14, wherein the CPU of the one of the plurality of host computing devices is further configured to instruct the first host computing device to upgrade software running on the first host computing device.

16. The computer system of claim 15, wherein selecting the second host computing device comprises determining that software running on the second host computing device is not scheduled for upgrade.

17. The computer system of claim 14, wherein the plurality of host computing devices includes a third host computing device, the other datastore is inaccessible by both the first and second host computing devices, and executing the NFC operation comprises the first and second host computing devices reading the data from the shared datastore and transmitting the data to the third host computing device and the third host computing device storing the transmitted data in the other datastore.

18. The computer system of claim 14, wherein the other datastore is accessible by both the first and second host computing devices, and wherein executing the NFC operation comprises the first and second host computing devices copying the data from the shared datastore to the other datastore.

19. The computer system of claim 14, wherein the NFC operation is performed by virtualization software layers, the virtualization software layers executing on the first and second host computing devices and abstracting hardware resources of the first and second host computing devices for virtual machines (VMs).

20. The computer system of claim 19, wherein the NFC operation comprises transmitting a virtual disk of a VM from the shared datastore to the other datastore.

* * * * *